United States Patent [19]

Saito et al.

[11] Patent Number: 4,617,289

[45] Date of Patent: Oct. 14, 1986

[54] CATALYST FOR PURIFYING DIESEL ENGINE EXHAUST GASES

[75] Inventors: Koichi Saito, Osaka; Kenji Ueda, Osaka; Yasuo Ikeda, Himeji; Tetsuji Ono, Amagasaki, all of Japan

[73] Assignee: Nippon Shokubai Kagaku Kogyo Co., Ltd., Osaka, Japan

[21] Appl. No.: 762,840

[22] Filed: Aug. 6, 1985

[30] Foreign Application Priority Data

Aug. 8, 1984 [JP] Japan ................................. 59-164808
Sep. 7, 1984 [JP] Japan ................................. 59-186578

[51] Int. Cl.$^4$ ............................................. B01J 23/64
[52] U.S. Cl. ................................... 502/339; 502/325; 423/215.5
[58] Field of Search ............... 502/325, 333, 334, 339; 423/213.5, 215.5

[56] References Cited

U.S. PATENT DOCUMENTS 4,303,552 12/1981 Ernest et al. .................... 502/313 X
4,515,758 5/1985 Domesle et al. ................. 423/215.5

*Primary Examiner*—W. J. Shine
*Attorney, Agent, or Firm*—Sherman and Shalloway

[57] ABSTRACT

A catalyst for purifying a diesel engine exhaust gas, said catalyst comprising a refractory three-dimensional structure having a gas filter function, a porous inorganic carrier supported on it, and (a) vanadium oxide and (b) at least one metal selected from the group consisting of platinum, rhodium and palladium supported on the carrier, the amount of component (a) being in the range of 0.2 to 40.0 g as $V_2O_5$ per liter of said structure and the amount of component (b) being in the range of 0.1 to 4.0 g as metal per liter of said structure.

6 Claims, 1 Drawing Figure

(a)/(b) MOLE RATIO VERSUS SO₂ CONVERSION RATIO AND Ti

CATALYST FOR PURIFYING DIESEL ENGINE EXHAUST GASES

This invention relates to a catalyst for purifying a diesel engine exhaust gas.

In recent years, particulate substances in diesel engine exhaust gases (composed mainly of solid carbon particles, sulfur-containing particles such as sulfate salts, and liquid or solid high-molecular-weight hydrocarbon particles) have tended to give rise to environmental and hygienic problems. Most of these particles have a particle size of less than 1 micron, and are liable to float in the atmosphere and be taken into the human body by respiration. Countermeasures are being taken by setting down more rigorous regulations on the emission of these fine particles from diesel engines.

Roughly, there are two methods of removing these fine particles. One comprises filtering an exhaust gas through a refractory gas filter (such as a ceramic foam, a wire mesh, a metal foam, or a wall flow monolithic honeycomb) to capture particulates, and when the pressure drop rises, burning the accumulated particulates with a burner or the like to regenerate the filter. The other comprises supporting a catalytic substance on a carrier having the structure of this refractory gas filter to permit the performance of both the filtering operation and the burning operation and to reduce the frequency of regenerations required, or increasing the burning activity of the catalyst to an extent that regeneration is unnecessary.

In the former, as the effect of removing the particulates is increased to a higher degree, the pressure drop rises more early, and the frequency of regenerations becomes larger. This is troublesome and will be extremely disadvantageous from an economic standpoint. In contrast, the latter method is considered to be much better if there is employed a catalyst substance which can maintain its catalytic activity effectively under the gas exhausting conditions in a diesel engine (gas composition and temperature).

The temperature of the exhaust gas from a diesel engine is much lower than in the case of a gasoline engine, and since a light oil is used as a fuel, the exhaust gas contains large amounts of sulfur oxides, mainly sulfur dioxide ($SO_2$). Hence, in spite of the need for a catalyst which has hardly any ability to form sulfates ($SO_3$ or sulfuric acid mist resulting from further oxidation of $SO_2$), but has the ability to ignite and burn the accumulated particulates well at temperatures obtained under normal engine operating conditions, no catalyst has yet been proposed which fully meets this requirement.

For example, Japanese Laid-Open Patent Publication No. 174236/1983 discloses a catalyst for removing particulates comprising a combination of vanadium or a vanadium compound with antimony, alkali metals, molybdenum, platinum, lanthanum, etc. Since the amount of vanadium used in this catalyst is far smaller than that of platinum, vanadium acts only to such an extent as to increase the ability of platinum to burn the particulates, and does not act to inhibit the ability to form sulfates.

Japanese Laid-Open Patent Publication No. 82944/1984 discloses a catalyst for removing particulates comprising a combination of copper or a copper compound with molybdenum or vanadium or further with platinum, rhodium, etc. This patent document, however, shows that results obtained with this catalyst are only the increase of particulate burning activity, and does not at all disclose the inhibition of the ability to form sulfates. (In fact, the present inventors have found that the copper component cannot increase the performance of the catalyst of this invention.) A catalyst comprising this Cu-Mo/V-Pt system and an alkali metal is disclosed in Japanese Laid-Open Patent Publication No. 12818/1984. This catalyst, however, has a greater tendency to form sulfates.

Generally, catalysts containing platinum-group metals have good particulate burning ability at low temperatures, but naturally, have a high ability to oxidize $SO_2$ to $SO_3$. The resulting sulfate ($SO_3$) extremely worsens the particulate removing efficiency within short periods of time. Hence, when a platinum-group metal is used for the aforesaid purpose, it is absolutely necessary to cause the platinum-group metal to have selectivity in order to inhibit the formation of sulfates and to avoid a loss of particulate burning activity. The platinum-group metal can be caused to have selectivity by various methods, for example a method, as shown in Japanese Laid-Open Patent Publication No. 36543/1984, in which platinum is deposited and heat-treated at 700° to 1,000° C., and a method, as shown in Japanese Laid-Open Patent Publication No. 80330/1984, in which palladium is combined with at least one of rhodium, ruthenium, nickel, zinc and titanium.

Mere heat-treatment of platinum as in the former method, however, cannot satisfactorily lead to the inhibition of sulfate formation. If platinum is heat-treated to an extent sufficient to inhibit the formation of sulfates, the ability of the catalyst to ignite particulates is reduced, and the catalyst has no selectivity.

The latter patent document only refers to a combination of palladium with at least one of rhodium, ruthenium, nickel, zinc and titanium, and is silent on the combination of a noble metal with vanadium as in the present invention.

It is an object of this invention to provide a catalyst which has a good ability to burn particulates, inhibits the formation of sulfates and has selectivity.

A more specific object of this invention is to provide a catalyst for purifying a diesel engine exhaust gas which has good burning behaviors of particulates within the temperatures of a diesel engine exhaust gas obtained during normal driving in towns and in which the rise of the pressure drop is slow, and burning and regeneration occur rapidly when the temperature of the exhaust gas reaches a predetermined point.

Figure 1:
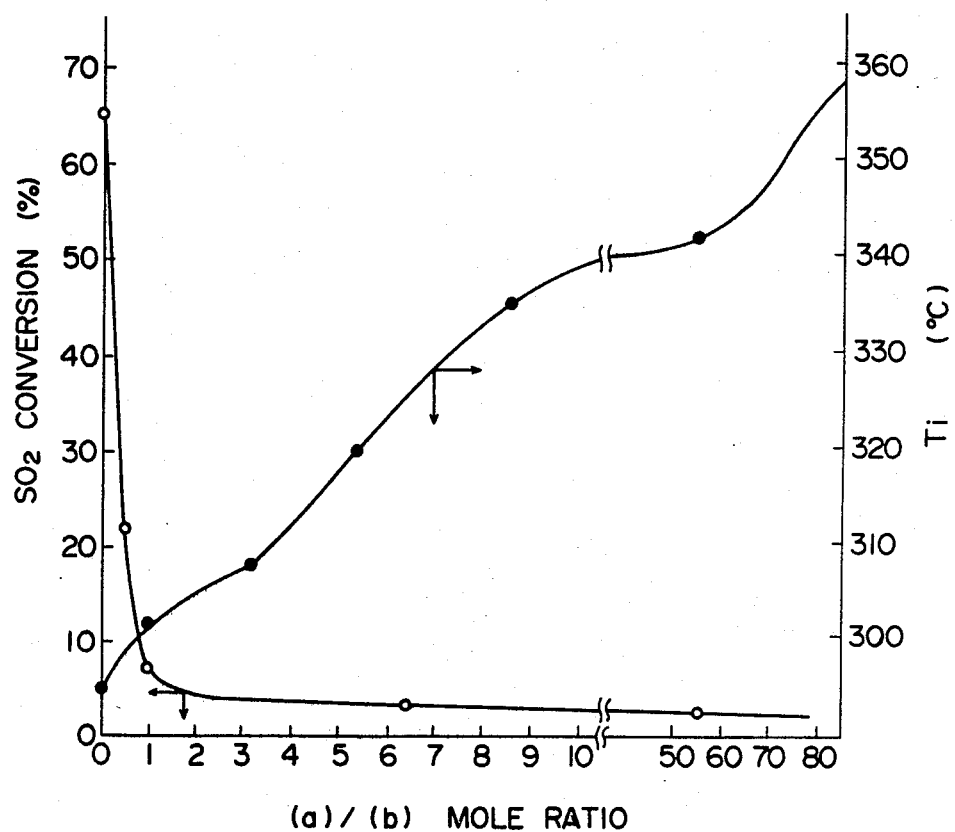
FIG. 1 shows the relation of the $SO_2$ conversion (%) and Ti (°C.) to the (a)/(b) mole ratio.

These objects of the invention are achieved by a catalyst for purifying a diesel engine exhaust gas, said catalyst comprising a refractory three-dimensional structure having a gas filter function, a porous inorganic carrier supported on it, and (a) vanadium oxide and (b) at least one metal selected from the group consisting of platinum, rhodium and palladium supported on the carrier, the amount of component (a) being in the range of 0.2 to 40.0 g as $V_2O_5$ per liter of said structure and the amount of component (b) being in the range of 0.1 to 4.0 g as metal per liter of said structure.

In especially preferred embodiments of this catalyst, component (b) is platinum; the mole ratio of component (a) to component (b) is 1–90:1; the refractory three-dimensional structure is a ceramic foam, a wire mesh, a metal foam or a wall flow monolithic honeycomb; or the catalyst is calcined in air at a temperature in the range of 300° to 1,000° C., preferably 700° to 1,000° C.

With the catalyst of this invention, the burning behavior of carbonaceous particulates is good even at temperatures below 350° C., and the pressure equilibrium temperature (the temperature at which an increase in pressure owing to the accumulation of particulates becomes equal to a decrease in pressure owing to the burning of particulates) is as low as 280° to 300° C. The accumulated particulates begin to burn at below 330° C., and the pressure drop abruptly decreases. The formation of a sulfate (conversion of $SO_2$ to $SO_3$) is almost 0% even at 450° C. In view of the fact that the temperature of an exhaust gas from a diesel engine is much lower than that of an exhaust gas from a gasoline engine and during driving in towns, does not reach 450° C. even at the manifold exit, it is apparent that the catalyst of this invention having such properties is useful for purification of diesel engine exhaust gases.

Usually, with catalysts comprising only base metals, the rise of the pressure drop is rapid until a predetermined temperature is reached, and when the aforesaid regeneration temperature is not reached under normal driving conditions, the regeneration of the catalyst must be forcibly carried out externally at a high frequency. Such catalysts lack practical utility. On the other hand, catalysts comprising platinum-group metals but having no selectivity have the ability to oxidize carbon monoxide (CO) and hydrocarbons (HC) and also the ability to oxidize $SO_2$ to a sulfate (with this catalyst, because easily combustible components in the particulates partly burn even at low temperatures, the rise of the pressure drop is slow, and the pressure equilibrium temperature is lower than with the catalysts comprising base metals only.)

In contrast, when the catalyst of this invention is obtained by calcining a composition of vanadium oxide and a platinum-group metal in air at a temperature of 700° to 1,000° C., its sulfate forming ability is almost completely inhibited and the resulting catalyst has an excellent ability to burn relatively easily burnable components, so-called SOF (soluble organic fraction), in the particulates. Such a catalyst is most suitable for the purification of diesel engine exhaust gases.

In the catalyst of this invention, the vanadium oxide as component (a) acts very closely on the platinum-group element of component (b). The sulfate-forming ability of the catalyst is most inhibited, and the particulate burning behavior is good, when the mole ratio of component (a) to component (b) is in the range of 1–90:1, preferably 1.5–60:1, and the amount of component (a) deposited is 0.2 to 40.0 g/liter of filter structure, preferably 0.5 to 35.0 g/liter-filter structure, and the amount of component (b) deposited is 0.1 to 4.0 g/liter of filter structure, preferably 0.3 to 3.0 g/liter of filter structure.

The preferred calcination at 700° to 1000° C. in this invention means a heat-treatment operation in the state where the vanadium component and the platinum-group metal component co-exist.

If only the platinum-group metal is calcined at high temperatures, its synergistic action with vanadium oxide to be co-present later is impaired, and the resulting catalyst has the ability to inhibit sulfate formation by the vanadium component, but the burning behavior of particulates is not satisfactory.

Raw materials for forming vanadium oxides in this invention are, for example, halides, oxyhalides, sulfate salts, oxysulfate salts and organic acid salts.

Except as described above, the catalyst of this invention is prepared in a customary manner. A preferred method of preparation is as follows:

First, a porous inorganic carrier such as an alumina powder, a silica-alumina powder, a zirconia powder or a titania powder, is slurried in a wet mill. The slurry is wash-coated on a three-dimensional structure such as a cordierite foam, dried and then fired. The structure is then immersed in an aqueous solution of the platinum-group metal to adsorb and support the platinum-group metal on the surface of the carrier by ionic adsorption. The resulting structure is then dried and fired. The resulting structure is then immersed in a solution of ammonium metavanadate dissolved with oxalic acid, withdrawn, and shaken to remove the excess of the solution to deposit a predetermined amount of the vanadium component. The resulting structure is dried, and finally calcined in air at 300° to 1,000° C., preferably 700° to 1000° C. for a time of usually 30 minutes to 10 hours, especially 1 to 5 hours.

Alternatively, the platinum-group metal component and the vanadium component are uniformly deposited in predetermined amounts on an alumina powder, and the alumina powder is calcined in air at a temperature of 300° to 1,000° C., preferably 700° to 1,000° C. for 30 minutes to 10 hours. The resulting powder is slurried in water, and the aqueous slurry is wash-coated on a three-dimensional structure. The resulting structure is dried at a temperature of 60° to 200° C.

The catalyst of this invention exhibits excellent particulate burning property owing to the presence of vanadium oxide, and excellent SOF burning property owing to the presence of the platinum-group metal with complete inhibition of the sulfate forming ability attributed to the presence of the platinum-group metal. If, however, the calcination temperature is lower than 700° C., the effect of inhibiting sulfate formation is slightly inferior, i.e. the conversion of $SO_2$ to $SO_3$ is 2 to 5% and the particulate burning property is kept in good performance when the temperature of the diesel engine exhaust gas is 450° C. If it is calcined at more than 1,000° C., the effect of inhibiting sulfate formation is sufficient, but the particulate burning property becomes slightly inferior.

If the amount of vanadium oxide deposited is less than 0.2 g/liter of filter structure, the ability to ignite and burn particulates is reduced, and if it exceeds 40 g/liter of filter structure, the property at low temperature of easily burning burnable components owing to the platinum-group metal is drastically reduced.

When metals other than vanadium are combined with the platinum-group metal, the resulting catalyst does not exhibit so good selectivity as in the case of combining vanadium, and has low practical utility. For example, when chromium, molybdenum, iron, cerium, magnesium or alkali metals are combined with the platinum-group metals, the resulting compositions have some degree of selectivity which is still insufficient.

The following Examples and Comparative Examples illustrate the present invention more specifically.

EXAMPLE 1

One kilogram of alumina powder was slurried in a wet mill, and deposited on a commercial cordierite foam (bulk density 0.35 g/cm$^3$, porosity 87.5%, volume 1.7 liters). The foam was shaken to remove the excess of the slurry, dried at 150° C. for 3 hours, and calcined at 500° C. for 2 hours to obtain a cordierite foam having an alumina coat layer. The foam was then immersed in 2 liters of a mixture of a nitric acid solution of 12.86 g as Pt of dinitrodiamminoplatinum and an aqueous solution of 1.286 g as Rh of rhodium nitrate, then shaken to remove the excess of the solution, dried at 150° C. for 3 hours and then calcined at 500° C. for 2 hours to obtain a cordierite foam having an alumina coat layer containing platinum and rhodium.

Ammonium metavanadate (55.1 g) was put into water, and with stirring, 66 g of oxalic acid was gradually added. Water was added to adjust the volume of the solution to 2 liters.

The foam was immersed in the solution, shaken to remove the excess of the aqueous solution, dried at 150° C. for 3 hours and then calcined at 500° C. for 2 hours.

The amounts of Pt and Rh deposited on the resulting catalyst were 0.90 g/liter of filter structure and 0.09 g/liter of filter structure, respectively, and the amount of vanadium oxide deposited was 3 g/liter of filter structure as $V_2O_5$.

The finished coat layer consisted of 94.6% by weight of alumina, 4.05% by weight of $V_2O_5$, and 1.35% by weight of Pt+Rh (Pt/Rh=10/1). The mole ratio of $V_2O_5/(Pt+Rh)$ was 3.0.

EXAMPLE 2

Alumina powder (700 g) was put in 800 ml of a mixture of a nitric acid solution of 9.0 g as Pt of dinitrodiamminoplatinum and an aqueous solution of 0.9 g as Rh of rhodium nitrate and they were well mixed. The mixture was dried at 150° C. for 5 hours, and calcined at 500° C. for 2 hours to obtain alumina powder containing Pt and Rh.

The alumina powder (480 g) and 20 g of $V_2O_5$ powder were mixed in a wet mill to form a slurry. The slurry was deposited on 1.7 liters of the same cordierite foam as used in Example 1. The foam was shaken to remove the excess of the slurry, dried at 150° C. for 3 hours, and calcined at 500° C. for 2 hours.

The finished coat layer consisted of 94.6% by weight of alumina, 4.05% by weight of $V_2O_5$ and 1.35% by weight of Pt+Rh (Pt/Rh=10/1). The mole ratio of $V_2O_5/(Pt+Rh)$ was 3.0.

EXAMPLE 3

A cordierite foam having an alumina coat layer was prepared in the same way as in Example 1. Three liters of a mixture of a nitric acid solution of 1.53 g as Pt of dinitrodiamminoplatinum and an aqueous solution of 0.153 g as Rh of rhodium nitrate was heated to about 60° C. The foam was immersed in the hot solution to adsorb and support Pt and Rh by ionic adsorption. After confirming that the solution became colorless, the foam was taken out, dried at 150° C. for 3 hours, and calcined at 500° C. for 2 hours.

Ammonium metavanadate (55.1 g) was put into water, and with stirring, 66 g of oxalic acid was gradually added. Water was added to adjust the volume of the solution to 2 liters.

The foam was immersed in this solution, shaken to remove the excess of the aqueous solution, dried at 150° C. for 3 hours, and calcined at 500° C. for 2 hours. The finished coat layer consisted of 94.6% by weight of alumina, 4.05% by weight of $V_2O_5$ and 1.35% by weight of Pt+Rh (Pt/Rh=10/1).

EXAMPLE 4

A catalyst was prepared in the same way as in Example 1 except that the amounts of ammonium metavanadate and oxalic acid were changed to 110.2 and 132 g, respectively. The amounts of Pt and Rh deposited on the resulting catalyst were 0.90 g and 0.09 g per liter of filter structure, respectively. The amount of $V_2O_5$ deposited was 6 g/liter of filter structure.

The finished coat layer consisted of 90.9% by weight of alumina, 7.79% by weight of $V_2O_5$, and 1.29% by weight of Pt+Rh(Pt/Rh=10/1). The mole ratio of $V_2O_5/(Pt+Rh)$ was 6.0.

EXAMPLE 5

Each of the catalysts indicated in Table 1 was prepared in the same way as in Example 2 except that an aqueous solution of palladium nitrate was used as a source of palladium.

TABLE 1

| Catalyst No. | Platinum-group metals (g/l-filter structure) | $V_2O_5$ (g/l-filter structure) | Porous inorganic carrier (g/l-filter structure) | $V_2O_5$/platinum-group metal (mole ratio) |
|---|---|---|---|---|
| 5-1 | Pt(0.9)—Rh(0.09) | 1.0 | $Al_2O_3$(70) | 1.0 |
| 5-2 | " | 3.0 | $Al_2O_3/SiO_2$ = 9/1 mole ratio, (70) | 3.0 |
| 5-3 | " | 5.0 | $Al_2O_3$(70) | 5.0 |
| 5-4 | " | 8.0 | $Al_2O_3$(70) | 8.0 |
| 5-5 | Pt(0.5)—Pd(0.4)—Rh(0.1) | 3.0 | $Al_2O_3$(70) | 2.3 |
| 5-6 | Pt(0.9)—Rh(0.09) | 3.0 | $Al_2O_3/TiO_2$ = 8/2 mole ratio, (70) | 3.0 |
| 5-7 | Pt(0.2) | 10.0 | $Al_2O_3$(70) | 53.6 |
| 5-8 | Pt(3.0) | 2.8 | $Al_2O_3$(70) | 1.0 |

EXAMPLE 6

A catalyst was prepared in the same way as in Example 1 except that the cordierite foam was replaced by 1.7 liter of a wall flow monolithic honeycomb structure having many flow passages along porous walls in which the flow passages are alternately closed on one side to permit the exhaust gas to flow forcibly through the porous walls.

The amounts of Pt and Rh deposited on the resulting catalyst were 0.9 g and 0.09 g per liter of the filter structure, respectively, and the amount of $V_2O_5$ deposited was 3 g/liter of filter structure.

The finished coat layer consisted of 94.6% by weight of alumina, 4.05% by weight of $V_2O_5$, and 1.35% by weight Pt+Rh (Pt/Rh=10/1). The mole ratio of $V_2O_5/(Pt+Rh)$ was 3.0.

COMPARATIVE EXAMPLE 1

A cordierite foam catalyst was prepared in the same way as in Example 1 except that the Pt and Rh components were not used. The amount of alumina deposited was 70 g/liter of filter structure and the amount of $V_2O_5$ deposited was 3 g/liter of filter structure.

COMPARATIVE EXAMPLE 2

A cordierite foam catalyst was prepared in the same way as in Example 1 except that ammonium metavanadate was not used. The amounts of alumina, Pt and Rh deposited were 70 g, 0.90 g, and 0.09 g, respectively, per liter of the filter strtucture.

COMPARATIVE EXAMPLE 3

A catalyst was prepared in the same way as in Example 1 except that the amounts of dinitrodiamminoplatinum as Pt, ammonium metavanadate and oxalic acid used were changed respectively to 2.14 g, 220 g, and 264 g, and rhodium nitrate was not used. The amounts of alumina, Pt and $V_2O_5$ deposited on the resulting catalyst were 70 g, 0.15 g, and 12 g, respectively, per liter of the filter structure. The finished coat layer consisted of 85.1% by weight of alumina, 14.6% by weight of $V_2O_5$ and 0.18% by weight of Pt. The mole ratio of $V_2O_5$/Pt was 85.8.

COMPARATIVE EXAMPLE 4

A catalyst was prepared in the same way as in Example 1 except that the amounts of dinitrodiamminoplatinum as Pt, ammonium metavanadate and oxalic acid used were changed respectively to 14.28 g, 8.52 g, and 10.2 g, and rhodium nitrate was not used. The amounts of alumina, Pt and $V_2O_5$ deposited were 70 g, 1.0 g and 0.464 g, respectively, per liter of the filter structure. The mole ratio of $V_2O_5$/Pt was 0.5.

COMPARATIVE EXAMPLE 5

A catalyst was prepared in the same way as in Example 1 except that ammonium metavanadate was replaced by chromium nitrate, and oxalic acid was not used. The amounts of alumina, Pt, Rh and chromioum oxide as $Cr_2O_3$ deposited were 70 g, 0.90 g, 0.09 g, and 3 g, respectively, per liter of the filter structure. The mole ratio of $Cr_2O_3$/platinum-group metals was 3.6.

EXAMPLE 7

The catalysts obtained in Examples 1 to 6 and Comparative Examples 1 to 5 were tested by using a 4-cylinder diesel engine with a displacement of 2300 cc. At an engine rotating speed of 2500 rpm and a torque of 4.0 kg-m, particulates were captured for about 2 hours. Then, the torque was increased by 0.5 kg-m every 5 minutes, and the variations in the pressure drop of the catalyst layer were continuously recorded. The temperature (Te) at which an increase in pressure owing to the accumulation of the particulates became equal to a decrease in pressure owing to the burning of the particulates, and the temperature (Ti) at which the particulates were ignited and burnt and the pressure drop abruptly decreased were determined. The pressure drop change per hour ($\Delta P$, mmHg/hr) was calculated from the recorded chart when the particulates were captured at 2500 rpm and a torque of 4.0 kg-m.

The conversion of $SO_2$ to $SO_3$ was measured at an exhaust gas temperature of 450° C. The $SO_2$ concentrations in the inlet and outlet gases were analyzed by a nondiffusion type infrared analyzer (NDIR method), and the conversion (%) of $SO_2$ was calculated from the following equation.

$SO_2$ conversion (%) =

$$\frac{\left(\begin{array}{c}SO_2 \text{ concentration, ppm} \\ \text{in the inlet gas}\end{array}\right) - \left(\begin{array}{c}SO_2 \text{ concentration, ppm,} \\ \text{in the outlet gas}\end{array}\right)}{SO_2 \text{ concentration, ppm, in the inlet gas}} \times 100$$

The results are shown in Table 2.

TABLE 2

| Catalyst No. | $\Delta P$ (mmHg/Hr) | Te (°C.) | Ti (°C.) | $SO_2$ Conversion (%) (at 450° C.) |
|---|---|---|---|---|
| Example 1 | 6 | 295 | 305 | 3 |
| Example 2 | 7 | 300 | 308 | 2 |
| Example 3 | 5 | 280 | 290 | 3 |
| Example 4 | 6 | 310 | 320 | 3 |
| Example 5-1 | 5 | 295 | 305 | 4 |
| Example 5-2 | 7 | 300 | 308 | 3 |
| Example 5-3 | 7 | 305 | 320 | 3 |
| Example 5-4 | 7 | 320 | 335 | 3 |
| Example 5-5 | 7 | 310 | 320 | 3 |
| Example 5-6 | 7 | 300 | 310 | 2 |
| Example 5-7 | 8 | 335 | 342 | 2 |
| Example 5-8 | 5 | 290 | 302 | 7 |
| Example 6 | 15 | 300 | 310 | 3 |
| Comparative Example 1 | 40 | 345 | 360 | 1 |
| Comparative Example 2 | 5 | 285 | 295 | 65 |
| Comparative Example 3 | 7 | 340 | 355 | 3 |
| Comparative Example 4 | 5 | 285 | 295 | 22 |
| Comparative Example 5 | 13 | 350 | 370 | 21 |

EXAMPLE 8

One kilogram of alumina powder was slurried by a wet mill, and deposited on a commercial cordierite foam (bulk density 0.35 g/cm$^3$, porosity 87.5%, volume 1.7 liters). The foam was shaken to remove the excess of the slurry, dried at 150° C. for 3 hours, and calcined at 500° C. for 2 hours to obtain a cordierite foam having an alumina coat layer. The foam was then immersed in 2 liters of a mixture of a nitric acid solution of 12.86 g as Pt of dinitrodiamminoplatinum and an aqueous solution of 1.286 g as Rh of rhodium nitrate, then shaken to remove the excess of the solution, dried at 150° C. for 3 hours and then calcined at 500° C. for 2 hours to obtain a cordierite foam having an alumina coat layer containing platinum and rhodium.

Ammonium metavanadate (367.5 g) was put into water, and with stirring, 441 g of oxalic acid was gradually added. Water was added to adjust the volume of the solution to 2 liters.

The foam was immersed in the solution, shaken to remove the excess of the aqueous solution, dried at 150° C. for 3 hours and then calcined at 750° C. for 2 hours.

The amounts of Pt and Rh deposited on the resulting catalyst were 0.90 g/liter of filter structure and 0.09 g/liter of filter structure, respectively, and the amount of vanadium oxide coated was 20 g/liter of filter structure as $V_2O_5$.

The finished coat layer consisted of 76.9% by weight of alumina, 22.0% by weight of $V_2O_5$, and 1.1% by weight of Pt+Rh (Pt/Rh=10/1). The mole ratio of $V_2O_5$/(Pt+Rh) was 20.

EXAMPLE 9

Alumina powder (700 g) was put in 800 ml of a mixture of a nitric acid solution of 9.0 g as Pt of dinitrodiamminoplatinum and an aqueous solution of 0.9 g as Rh of rhodium nitrate and they were well mixed. The mixture was dried at 150° C. for 5 hours, and calcined at 500° C. for 2 hours to obtain alumina powder containing Pt and Rh.

The above alumina powder (479 g) and 137 g of $V_2O_5$ powder were mixed in a wet mill to form a slurry. The slurry was deposited on 1.7 liters of the same cordierite foam as used in Example 8. The foam was shaken to remove the excess of the slurry, dried at 150° C. for 3 hours, and calcined at 750° C. for 2 hours.

The finished coat layer consisted of 76.9% by weight of alumina, 21.9% by weight of $V_2O_5$ and 1.1% by weight of Pt+Rh (Pt/Rh=10/1). The mole ratio of $V_2O_5/(Pt+Rh)$ was 20.

EXAMPLE 10

A cordierite foam having an alumina coat layer was prepared in the same way as in Example 8. Three liters of a mixture of a nitric acid solution of 1.53 g as Pt of dinitrodiamminoplatinum and an aqueous solution of 0.153 g as Rh of rhodium nitrate was heated to about 60° C. The foam was immersed in the hot solution to adsorb and support Pt and Rh by ionic adsorption. After confirming that the solution became colorless, the foam was taken out, dried at 150° C. for 3 hours, and calcined at 500° C. for 2 hours.

Ammonium metavanadate (367.5 g) was put into water, and with stirring, 441 g of oxalic acid was gradually added. Water was added to adjust the volume of the solution to 2 liters.

The foam was immersed in this solution, shaken to remove the excess of the aqueous solution, dried at 150° C. for 3 hours, and calcined at 750° C. for 2 hours. The finished coat layer consisted of 76.9% by weight of alumina, 21.9% by weight of $V_2O_5$ and 1.1% by weight of Pt+Rh (Pt/Rh=10/1).

EXAMPLE 11

A catalyst was prepared in the same way as in Example 8 except that the amounts of ammonium metavanadate and oxalic acid were changed to 551.3 and 661 g, respectively. The amounts of Pt and Rh deposited on the resulting catalyst were 0.90 g and 0.09 g per liter of filter structure, respectively. The amount of $V_2O_5$ deposited was 30 g/liter of filter structure.

The finished coat layer consisted of 69.3% by weight of alumina, 29.7% by weight of $V_2O_5$, and 0.99% by weight of Pt+Rh(Pt/Rh=10/1). The mole ratio of $V_2O_5/(Pt+Rh)$ was 30.

EXAMPLE 12

Each of the catalysts indicated in Table 3 was prepared in the same way as in Example 9 except that an aqueous solution of palladium nitrate was used as a source of palladium.

TABLE 3

| Catalyst No. | Platinum-group metals (g/l-filter structure) | $V_2O_5$ (g/l-filter structure) | Porous inorganic carrier (g/l-filter structure) | $V_2O_5$/platinum-group metal (mole ratio) |
|---|---|---|---|---|
| 12-1 | Pt(0.9)—Rh(0.09) | 1.0 | $Al_2O_3$(70) | 1.0 |
| 12-2 | " | 5 | " | 5.0 |
| 12-3 | " | 10 | " | 10.0 |
| 12-4 | " | 15 | " | 15.0 |
| 12-5 | " | 40 | " | 40.0 |
| 12-6 | " | 20 | $Al_2O_3/SiO_2$ = 9.1 mole ratio, (70) | 20.0 |
| 12-7 | " | 20 | $Al_2O_3/TiO_2$ = 8/2 mole ratio, (70) | 20.0 |
| 12-8 | Pt(0.5)—Pd(0.4)—Rh(0.1) | 20 | $Al_2O_3$(70) | 15.1 |
| 12-9 | Pt(0.4) | 22.4 | $Al_2O_3$(70) | 60 |
| 12-10 | Pt(0.2) | 0.3 | $Al_2O_3$(70) | 1.61 |
| 12-11 | Pt(3.0) | 5.0 | $Al_2O_3$(70) | 1.8 |

EXAMPLE 13

A catalyst was prepared in the same way as in Example 8 except that the cordierite foam was replaced by 1.7 liters of the same wall flow monolithic honeycomb structure as used in Example 6.

The amounts of Pt and Rh deposited on the resulting catalyst were 0.9 g and 0.09 g per liter of the filter structure, respectively, and the amount of $V_2O_5$ deposited was 20 g/liter of filter structure.

The finished coat layer consisted of 76.9% by weight of alumina, 22.0% by weight of $V_2O_5$, and 1.1% by weight Pt+Rh (Pt/Rh=10/1). The mole ratio of $V_2O_5/(Pt+Rh)$ was 20.

COMPARATIVE EXAMPLE 6

A cordierite foam catalyst was prepared in the same way as in Example 8 except that the Pt and Rh components were not used. The amounts of alumina and $V_2O_5$ deposited was 70 g and 20 g, respectively, per liter of the filter structure.

COMPARATIVE EXAMPLE 7

A cordierite foam catalyst was prepared in the same way as in Example 8 except that ammonium metavanadate was not used. The amounts of alumina, Pt and Rh deposited were 70 g, 0.90 g, and 0.09 g, respectively, per liter of the filter structure.

COMPARATIVE EXAMPLE 8

A catalyst was prepared in the same way as in Example 8 except that the final calcination was carried out at 500° C. The amounts of alumina, Pt and Rh deposited were 70 g, 0.90 g and 0.09 g, respectively, per liter of the filter structure, and the amount of vanadium oxide deposited was 20 g/liter of filter structure as $V_2O_5$.

The finished coat layer consisted of 76.9% by weight of alumina, 22.0% by weight of $V_2O_5$ and 1.1% by weight of Pt+Rh (Pt/Rh=10/1). The mole ratio of $V_2O_5/(Pt+Rh)$ was 20.

COMPARATIVE EXAMPLE 9

A catalyst was prepared in the same way as in Example 8 except that the amounts of dinitrodiamminoplatinum as Pt, ammonium metavanadate and oxalic acid used were changed respectively to 14.28 g, 8.52 g, and 10.2 g, and rhodium nitrate was not used. The amounts of alumina, Pt and V₂O₅ deposited on the resulting catalyst were 70 g, 1.0 g, and 0.464 g, respectively, per liter of the filter structure. The mole ratio of $V_2O_5/Pt$ was 0.5.

COMPARATIVE EXAMPLE 10

A catalyst was prepared in the same way as in Example 8 except that ammonium metavanadate was replaced by chromium nitrate, and oxalic acid was not used. The amounts of alumina, Pt, Rh and chromioum oxide as $Cr_2O_3$ deposited were 70 g, 0.90 g, 0.09 g, and 20 g, respectively, per liter of the filter structure. The mole ratio of $Cr_2O_3$/platinum-group metals was 24.

EXAMPLE 14

The catalysts obtained in Examples 8 to 13 and Comparative Examples 6 to 10 were tested in the same way as in Example 7. The results are shown in Table 4.

TABLE 4

| Catalyst No. | ΔP (mmHg/Hr) | Te (°C.) | Ti (°C.) | SO₂ Conversion (%) (at 450° C.) |
|---|---|---|---|---|
| Example 8 | 6 | 325 | 334 | 0 |
| Example 9 | 7 | 320 | 332 | 0 |
| Example 10 | 5 | 320 | 333 | 0 |
| Example 11 | 7 | 325 | 337 | 0 |
| Example 12-1 | 5 | 330 | 342 | 0 |
| Example 12-2 | 7 | 325 | 338 | 0 |
| Example 12-3 | 7 | 325 | 335 | 0 |
| Example 12-4 | 7 | 320 | 333 | 0 |
| Example 12-5 | 7 | 325 | 335 | 0 |
| Example 12-6 | 7 | 320 | 332 | 0 |
| Example 12-7 | 7 | 320 | 334 | 0 |
| Example 12-8 | 7 | 325 | 338 | 0 |
| Example 12-9 | 8 | 325 | 336 | 0 |
| Example 12-10 | 8 | 335 | 347 | 0 |
| Example 12-11 | 6 | 320 | 334 | 0 |
| Example 13 | 15 | 325 | 337 | 0 |
| Comparative Example 6 | 40 | 345 | 363 | 0 |
| Comparative Example 7 | 5 | 405 | 418 | 34 |
| Comparative Example 8 | 7 | 330 | 340 | 4 |
| Comparative Example 9 | 5 | 385 | 403 | 17 |
| Comparative Example 10 | 13 | 375 | 392 | 18 |

What is claimed is:

1. A catalyst for purifying a diesel engine exhaust gas, said catalyst comprising a refractory three-dimensional structure having a gas filter function, a porous inorganic carrier supported on it, and (a) vanadium oxide and (b) at least one metal selected from the group consisting of platinum, rhodium and palladium supported on the carrier, the amount of component (a) being in the range of 0.2 to 40.0 g as V₂O₅ per liter of said structure and the amount of component (b) being in the range of 0.1 to 4.0 g as metal per liter of said structure, wherein the mole ratio of component (a) to component (b) deposited as 1-90:1.

2. The catalyst of claim 1 wherein the component (b) is platinum.

3. The catalyst of any one of claims 1 or 2 wherein the refractory three-dimensional structure is a ceramic foam, a wire mesh, a metal foam or a wall flow monolithic honeycomb having many flow passages along porous walls in which the flow passages are alternately closed on one side to permit the exhaust gas to flow forcibly through the porous walls.

4. The catalyst of any one of claims 1 or 2 which has been prepared by calcining in air at a temperature of 700° to 1,000° C.

5. The catalyst of claim 4 wherein the refractory threee-dimensional structure is a ceramic foam, a wire mesh, a metal foam or a wall flow monolithic honeycomb having many flow passages along porous walls in which the flow passages are alternately closed on one side to permit the exhaust gas to flow forcibly through the porous walls.

6. The catalyst of claim 1 wherein the mole ratio of component (a) to component (b) is in the range of from 1.5-60:1 and where the amount of component (a) is from 0.5 to 35.0 g as V₂O₅ per liter of said structure and the amount of component (b) is in the range of 0.3 to 3.0 g/liter as metal per liter of said structure.

* * * * *